United States Patent [19]

Mang et al.

[11] Patent Number: 5,138,022
[45] Date of Patent: Aug. 11, 1992

[54] THERMOPLASTIC POLYESTERS CONTAINING BIPHENYLENE LINKAGES

[75] Inventors: Michael N. Mang; James L. Brewbaker, both of Midland, Mich.

[73] Assignee: The Dow Chemical Company, Midland, Mich.

[21] Appl. No.: 739,266

[22] Filed: Aug. 1, 1991

[51] Int. Cl.$^5$ .............................................. C08G 63/20
[52] U.S. Cl. ..................... 528/272; 528/279; 528/302; 528/305; 528/307; 528/308; 528/373; 528/391; 428/35.7; 428/364
[58] Field of Search .............. 528/272, 279, 302, 305, 528/307, 308, 373, 391; 428/364, 35.7

[56] References Cited

U.S. PATENT DOCUMENTS

| | | | |
|---|---|---|---|
| 4,222,928 | 9/1980 | Kawamura et al. | 523/451 |
| 4,417,018 | 11/1983 | Ogawa et al. | 524/261 |
| 4,891,448 | 1/1990 | Garces et al. | 568/628 |
| 4,914,179 | 4/1990 | Morris et al. | 528/272 |
| 4,956,448 | 9/1990 | Morris et al. | 528/272 |
| 4,959,450 | 9/1990 | Morris et al. | 528/272 |
| 4,973,654 | 11/1990 | Morris et al. | 528/272 |
| 5,011,877 | 4/1991 | Morris et al. | 524/115 |
| 5,037,946 | 8/1991 | Morris et al. | 528/272 |
| 5,037,947 | 8/1991 | Morris et al. | 528/272 |
| 5,045,610 | 9/1991 | Bales et al. | 525/439 |
| 5,057,595 | 10/1991 | Morris et al. | 528/272 |
| 5,081,220 | 1/1992 | Morris et al. | 528/272 |

*Primary Examiner*—Samuel A. Acquah

[57] ABSTRACT

Aliphatic polyesters of 3,4'-biphenyldicarboxylic acid and optionally 4,4'-biphenyldicarboxylic acid are prepared by contacting at least one aliphatic diol having from 2 to 12 carbon atoms with a lower alkyl diester or phenolic diester of 3,4'-biphenyldicarboxylic acid and, optionally, a lower alkyl diester or phenolic diester of 4,4'-biphenyldicarboxylic acid, in the presence of a catalyst at about 180° to about 300° C. These polyesters are suitable for use in making fibers, films, three dimensional molded articles, barrier containers and coatings.

19 Claims, No Drawings

THERMOPLASTIC POLYESTERS CONTAINING BIPHENYLENE LINKAGES

BACKGROUND OF THE INVENTION

The present invention relates to thermoplastic polyesters which are melt processable, and more particularly to thermoplastic polyesters containing isomers of biphenyldicarboxylic acid.

Thermoplastic polyesters containing isomers of biphenyldicarboxylic acid are known to be useful in the fabrication of articles such as fibers which are useful as tire cords, reinforcement in hoses, cables, conveyor belts or composite structures with matrixes prepared from other resinous materials. These polyesters are also known to be useful in the manufacture of films which have excellent solvent and chemical resistance, low flammability and good electrical insulating properties.

Homopolyesters of 4,4'-biphenyldicarboxylic acid and certain aliphatic diols and copolyesters of this diacid and mixtures of aliphatic diols are disclosed in the literature. For example, Ezard, in the *Journal of Polymer Science*, Volume 9(1), page 35, (1952), discloses the homopolyester of 4,4'-biphenyldicarboxylic acid and ethylene glycol; and Meurisse et al., in the *British Polymer Journal*, Volume 13, page 57 (1981), disclose the homopolyesters of 4,4'-biphenyldicarboxylic acid and 1,4-butanediol and 1,6-hexanediol. Copolyesters of 4,4'-biphenyldicarboxylic acid and mixtures of aliphatic diols are disclosed in U.S. Pat. No. 2,976,266.

The homopolyester of ethylene glycol and 4,4'-biphenyldicarboxylic acid melts at 343° C., too high to be molded from its melt. This polyester and other similar polyesters containing units derived from aliphatic diols begin to degrade at significant rates at temperatures significantly above 300° C. To make melt processing possible, it is necessary to change the polymer's composition slightly to lower its $T_m$ into a range where it is more thermally stable. A process for doing this comprises incorporating terephthalate units into poly(ethylene 4,4'-biphenyldicarboxylate) as disclosed by Krigbaum et al. in the *Journal of Polymer Science, Polym. Letters*, Volume 20, page 109 (1982). However, copolyesters of 4,4'-biphenyldicarboxylic acid, terephthalic acid and ethylene glycol tend to be brittle and have only limited utility.

It would be highly desirable to provide thermoplastic polyesters which are melt processable, which are not brittle and which do not have the disadvantages exhibited by the prior art polymers.

SUMMARY OF THE INVENTION

The present invention is, in one aspect, a thermoplastic polyester having repeating units derived from 3,4'-biphenyldicarboxylic acid and at least one aliphatic diol having from 2 to 12 carbon atoms.

In another aspect, this invention is a thermoplastic polyester having repeating units derived from 3,4'-biphenyldicarboxylic acid, 4,4'-biphenyldicarboxylic acid, and at least one aliphatic diol having from 2 to 12 carbon atoms.

In still another aspect, this invention is a process for preparing a thermoplastic polyester which comprises contacting at least one aliphatic diol having from 2 to 12 carbon atoms with a lower alkyl diester or phenolic diester of 3,4'-biphenyldicarboxylic acid and, optionally, a lower alkyl diester or phenolic diester of 4,4'-biphenyl-dicarboxylic acid under conditions sufficient to form the polyesters of this invention.

The polyesters of this invention can be fabricated into fibers, films, three dimensional molded articles, barrier containers and coatings by using conventional fabrication techniques such as extrusion, compression molding and injection molding.

Surprisingly, using 3,4'-biphenyldicarboxylic acid, in place of at least a portion of 4,4'-biphenyldicarboxylic acid, in the preparation of the polyesters of this invention, lowers the temperature at which a tractable melt is formed into a range where the polyesters are thermally stable making melt fabrication possible. It is also surprising that the polyesters of this invention have increased toughness, and can provide compositions which are amorphous and clear, because copolyesters containing units derived from 4,4'-biphenyldicarboxylic acid are usually brittle, highly opaque and highly crystalline. Furthermore, it is surprising that some of the copolyesters of this invention melt to form optically anisotropic liquids which are useful in making three dimensional molded articles.

DETAILED DESCRIPTION OF THE INVENTION

Preferably, the polyesters of this invention have repeating units represented by the formula:

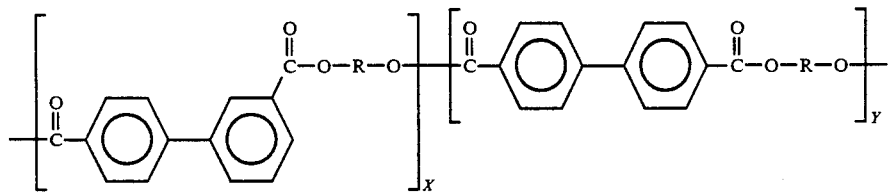

wherein R is a predominantly hydrocarbylene such as (1) alkylene having from 1 to 12 carbons such as n-butylene, n-pentylene, n-hexylene, n-octylene or dodecylene; (2) alkyleneoxyalkylene such as ethyleneoxyethylene; (3) alkylenethioalkylene such as ethylenethioethylene or alkylenesulfonylalkylene such as ethylenesulfonylethylene; (4) alkyleneoxyaryloxyalkylene such as ethyleneoxyphenoxyethylene; or (5) alkylenearylenealkylene such as methylenephenylmethylene; X+Y is from 10 to 1000; and X/(X+Y) is from 0.05 to 1.0.

More preferably, $X+Y$=50 to 500 and $X/(X+Y)$=0.15 to 1.0; and R is alkylene having from 2 to 6 carbons, most preferably 2 carbons.

The more preferred polyesters of this invention are represented by the formula:

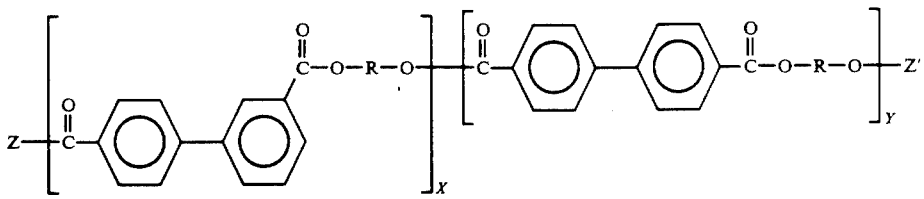

wherein R, X and Y are as defined previously, Z is a monovalent organic terminating group, such as HO—, CH$_3$O, HORO— and HORORO— and Z' is a monovalent organic terminating group such as —H, —ROH, —C(O)C$_6$H$_4$—C$_6$H$_4$C(O)OCH$_3$ and —C(O)C$_6$H$_4$—C$_6$H$_4$C(O)OH, wherein R is as defined previously.

The polyesters of this invention can be prepared by any of several well known polyester-forming methods. Several of these are described by Sandler et al. in "*Polymer Synthesis*", Vol. 1, Academic Press, New York, 1974, page 55, the relevant portions of which are incorporated herein by reference. For example, the polyesters of this invention may be prepared from the diacid chlorides of 3,4'-biphenyldicarboxylic acid or mixtures of the diacid chlorides of 3,4'-biphenyldicarboxylic acid and 4,4'-biphenyldicarboxylic acid and at least one diol in a suitable solvent with or without an acid acceptor such as pyridine. They may also be prepared by direct esterification from the diacids and diols. Preferably, they are prepared by the melt transesterification method from the diols and lower alkyl diesters or phenolic diesters of the diacids. The molecular weights of the semicrystalline polyesters of this invention may be increased by continuing the polymerization in the solid state at temperatures slightly below their softening points or below the temperatures where thermal decomposition becomes significant, whichever is lower, either at reduced pressure or in an atmosphere being swept with an inert gas.

Advantageously, the polyesters of this invention are prepared by contacting the dimethyl esters of the diacids and diols in the presence of about 0.05 weight percent of titanium tetraisopropoxide, based on the weight of the starting materials, in an atmosphere of nitrogen or other inert gas at 180° C. to 220° C. until the distillation of methanol slows. Two or slightly more than two moles of diol are used for every mole of dimethyl ester employed. The temperature is then slowly increased to about 260° C. to complete the conversion of the dimethyl esters to the di(hydroxyalkyl) esters. The pressure is also slowly decreased to about 1 mm of Hg to distill the excess diol and convert the reaction mass into high molecular weight polyester. It is desirable to keep the temperature of the polymer above its melting point so that it can be stirred during the entire polymerization, but below the temperature where significant decomposition of the polymer occurs. When diols containing secondary hydroxyls are used, the temperature in this second polymer-forming step of the process is held at or below about 260° C. When diols containing only primary hydroxyls are used, the temperature in the final step may be increased to about 300° C. The most preferred conditions for preparing the polyesters of this invention are set forth in the following working examples.

Suitable diesters include the dimethyl esters, the diethyl esters and the diphenyl esters. Other suitable diesters are described in U.S. Pat. No. 4,914,179, the relevant portions of which are herein incorporated by reference.

Suitable diols are aliphatic diols containing from 2 to 12 carbon atoms, including straight-chain and branched aliphatic diols such as ethylene glycol, 1,2-propylene glycol, 1,3-propylene glycol, 1,4-butanediol, neopentyl glycol, 1,6-hexanediol, 1,8-octanediol, and 1,10-decanediol; alicyclic diols such as trans-1,4-cyclohexanediol, cis-1,4-cyclohexanediol, trans-1,4-cyclohexanedimethanol, cis-1,4-cyclohexanedimethanol, trans-1,3-cyclohexanedimethanol; and alkyl-, alkoxy-, or halogen-substituted derivatives of the above said alicyclic diols such as trans-1,4-(2-methyl)cyclohexanediol and trans-1,4-(2-chloro)cyclohexanediol; aliphatic diols containing heteroatoms such as diethylene glycol, triethylene glycol and dipropylene glycol. The preferred diols are ethylene glycol, 2,2-dimethyl-1,3-propanediol, 1,4-butanediol and 1,4-cyclohexanedimethanol. The most preferred diol is ethylene glycol.

Suitable catalysts are employed for either the direct esterification or the transesterification methods. Examples of such catalysts are protonic acids, Lewis acids, titanium alkoxides such as titanium tetraisopropoxide, dialkyl tin oxides, and carbonates, alkanoates, or alkoxides of lithium, sodium, zinc, magnesium, or calcium. The preferred catalyst is titanium tetraisopropoxide. Typically, the catalyst is used in an amount of from 0.001 to 1.0 weight percent, based on the total weight of the reactants, and is preferably used in an amount of from 0.01 to 0.2 weight percent.

Conventional additives and processing aids can be added to the copolyester melts of the invention to improve the properties of articles made therefrom. Examples of additives are oxidation stabilizers, heat stabilizers, ultraviolet light (UV) stabilizers, lubricants, mold release agents, dyes and pigments, fibrous or powdered fillers and reinforcing agents, nucleating agents, flame retardants and plasticizers.

Examples of oxidation stabilizers and heat stabilizers are halides of metals of group I of the Periodic Table, used alone and used as a mixture with copper (1) halides or sterically hindered phenols in concentrations from 0.001 to 1 weight percent based on the weight of the copolyester composition.

Examples of UV stabilizers are substituted resorcinols, salicylates, benzotriazoles, benzophenones and mixtures of these, which are added, for example, in amounts of from 0.001 to 2 weight percent based on the weight of the copolyester composition.

Dyes and pigments are used, for example, in amounts of from 0.001 to 5 weight percent based on the weight of the copolyester composition. Examples are nigrosine, titanium dioxide, cadmium sulfide, phthalocyanine dyes, ultramarine blue and carbon black.

Examples of fillers and reinforcing agents are carbon fibers, glass fibers, polyaramid fibers, amorphous silica, calcium silicate, aluminum silicate, magnesium carbonate, kaolin, chalk, powdered quartz, talc, mica and feldspar, which may be present in a concentration from 0.5 to 70 weight percent, based on the total weight of the filled material.

Examples of nucleating agents are talc, calcium fluoride, sodium phenylphosphonate, alumina and finely divided polytetrafluoroethylene. Suitably, the nucleating agent may be present in an amount of from 0.001 to 1 weight percent, based on the weight of the copolyester composition.

Examples of flame retardant additives include phosphorous-containing compounds, halogen-containing compounds and combinations of halogen-containing compounds and antimony compounds.

Plasticizers, such as phthalates, hydrocarbon oils and sulfonamides can be added in an amount of from 0.0001 to 20 weight percent, based on the weight of the composition.

The polyesters of this invention can have a wide range of properties depending on the diol or mixture of diols chosen to provide the alkylene unit, R, and on the mole fraction of 3,4'-biphenylidicarboxylate units, $X/(X+Y)$, incorporated into the polyester. When R is derived from ethylene glycol and the mole fraction of 3,4'-biphenyldicarboxylate units, $X/(X+Y)$, is below about 0.5, the copolyesters are semicrystalline. When this ratio is below about 0.4, the copolyesters crystallize rapidly to opaque solids that have high tensile moduli. For example, when $X/(X+Y)$ is 0.25, the room temperature tensile modulus of injection molded $\frac{1}{8}$-in. thick test bars is 578,000 psi. Composites formed from glass fibers and the semicrystalline versions of the copolyester of this invention can retain a significant portion of their room temperature stiffness at very high temperatures. For example, a composite containing 20 weight percent of 3/16-in. long glass fibers and the copolyester noted above retains a quarter of its room temperature stiffness at 257° C. A composite made in the same way from a commercial sample of polyethylene terephthalate and annealed to crystallize the matrix resin retains the same fraction of its room temperature stiffness to only 230° C. Thus, within the polyesters of this invention are compositions that are useful for applications requiring a high room temperature modulus and the ability to retain a useful fraction of that modulus at high temperatures. When $X/(X+Y)$ is above about 0.5 and R is derived from ethylene glycol, the polymers are amorphous, transparent plastics with glass transition temperatures ranging from 104° C. to 111° C. These polyesters also form tough, transparent films that are good barriers to oxygen. For example, compression molded films of the homopolyester of 3,4'-biphenyldicarboxylic acid and ethylene glycol have an oxygen transmission rate of 6.8 cc. mil./100 in.$^2$ day atm. at 25° C. and 60% relative humidity, which makes these films good barriers to oxygen. When $X/(X+Y)$ is 0.2, and R is derived from a 73/27 mixture of the trans and cis isomers of 1,4-cyclohexanedimethanol, the polymer forms a liquid crystalline melt when heated above its melting point.

The following working examples are given to illustrate the invention and should not be construed as limiting its scope. All parts and percentages are by weight unless otherwise specifically noted.

In the following examples, inherent viscosities are determined at 25° C. and 0.1 g/dL or 0.5 g/dL in a 35/65 vol/vol mixture of trifluoroacetic acid and methylene chloride using an Ubbelohde capillary viscometer. Differential scanning calorimetric analyses are performed either by using a Du Pont 9900 thermal analyzer or a Mettler DSC 30 cell attached to a TC10A thermal analysis processor. Samples (15 mg) are scanned at 20° C./min from 50° C. to 300° C. for amorphous compositions and from 50° C. to slightly above their melting points for crystalline compositions. Dynamic mechanic analyses are performed on a DuPont 983 DMA at a fixed frequency of 1 Hz. and a temperature scanning rate of 5° C./minute. Oxygen transmission rates are measured according to ASTM D-3985 on 0.010-inch thick compression molded films that are quenched from the melt in an ice water bath using a Mocon Oxtran 1050 with 100% oxygen as the test gas at 60% relative humidity.

EXAMPLE 1

A. Preparation of 3,4-Diisopropylbiphenyl 3,4-diisopropylbiphenyl is prepared by alkylating biphenyl with propylene in the presence of an acidic mordenite catalyst in accordance with the process described in U.S. Pat. No. 5,004,841.

B. Preparation of 3,4-Biphenylidicarboxylic acid

A 1-liter stirred Parr bomb is charged with sodium dichromate (420 g, 1.41 mol), 3,4'-diisopropylbiphenyl (50 ml), and water (500 ml). The bomb is sealed and heated to 250° C. for 24 hours with rapid agitation. At this time, the bomb is allowed to cool and is vented. The mixture is decanted, filtered through a medium porosity glass frit, and acidified with concentrated hydrochloric acid. The product is collected by filtration and dried in a vacuum oven at 100° C. prior to recrystallization from hot glacial acetic acid

C. Preparation of Dimethyl 3,4'-Biphenyldicarboxylate

A slurry of 92 g (0.38 mole) of 3,4'-biphenyldicarboxylic acid in a solution of 180.8 g (1.52 moles) of thionyl chloride and 0.09 g (0.38 millimole) of benzyltriethylammonium chloride in 920 mL of 1,2-dichloroethane is refluxed for three hours. All the solids dissolve. The solvent and excess thionyl chloride are distilled first at atmospheric pressure, then at reduced pressure to insure their complete removal. Four hundred milliliters of 1,2-dichloroethane is added to dissolve the white solid that remains. Slowly, 500 mL of methanol is added to this solution. After the addition is complete, the solution is refluxed for 1 hour. The solvent and excess methanol are removed by distillation and any solid that remains is dissolved in 500 mL of methylene chloride. This solution is washed in turn with 1N sodium hydroxide solution, 1N hydrochloric acid solution, 5% sodium bicarbonate solution and water and dried over magnesium sulfate. The solvent is removed and the remaining solid is recrystallized from 800 mL of methanol yielding 89.2 (87%) of white dimethyl 3,4'-biphenyldicarboxylate, m.p. 86°-87° C.

The following Examples 2 to 10 relate to the preparation of homopolyesters and copolyesters of ethylene glycol, dimethyl 3,4'-biphenyldicarboxylate and, optionally, dimethyl 4,4'-biphenyldicarboxylate. The dimethyl 3,4'-biphenyldicarboxylate is prepared as in Example 1. The dimethyl 4,4'-biphenyldicarboxylate is also prepared as in Example 1 except that 4,4'-biphenyldicarboxylic acid is used instead of 3,4'-biphenyldicarboxylic acid.

EXAMPLE 2

Preparation of Poly(0.75 ethylene 4,4'-biphenyldicarboxylate-co-0.25 ethylene 3,4'-biphenyldicarboxylate)

A clear solution of 243.3 g (0.900 mole) of dimethyl 4,4'-biphenyldicarboxylate, 81.2 g of dimethyl 3,4'-biphenyldicarboxylate, 150.5 g (2.43 mole) of ethylene glycol and 50 µL of titanium tetraisopropoxide is stirred at 217° C. under nitrogen in a 1-L round bottom flask equipped with a paddle stirrer, Vigreaux column, distillation head, condenser, receiver and nitrogen inlet. The apparatus is heated in a molten salt bath until methanol begins to distill. After 2.7 hours, the temperature is slowly increased to 260° C. where it is held for 45 minutes. The distillate (104 mL) that has collected is discarded. Over the next 48 minutes the temperature is increased to 300° C. and the pressure is slowly reduced to 1 mm Hg. More liquid is distilled. The viscosity of the clear reaction mass slowly increases. After 8 minutes at 300° C., the heating bath is lowered and nitrogen is admitted. The polymer solidifies to an opaque creamy white solid when it cools. It is ground to coarse granules in a Wiley mill. The copolyester has an inherent viscosity of 0.72 dL/g, a Tg of 122° C. and a Tm of 293° C. The molecular weight of this polymer is advanced in the solid state by stirring the granules at 240° C. and 1 mm Hg for 3.2 hours. The advanced polymer has an inherent viscosity of 1.05 dL/g. It is injection molded into standard one eight-inch thick test bars at 316° C. into a mold held at 65° C. using an Arburg 170CDM injection molding machine. The tensile modulus and impact strength of these test bars are measured using procedures described in ASTM Test Nos. D638 and D256, respectively. The tensile modulus is 578 kpsi and the notched Izod impact strength is 1.2 ft. lb./in.

EXAMPLE 3

Preparation of Poly(0.75 ethylene 4,4'-biphenyldicarboxylate-co-0.25 ethylene 3,4'-biphenyldicarboxylate)

Dimethyl 3,4'-biphenyldicarboxylate (6.00 g, 0.0222 mole), 18.00 g (0.0666 mole) of dimethyl 4,4'-biphenyldicarboxylate, 12.83 g of ethylene glycol and 20 µL of titanium tetraisopropoxide are added to a 100 mL round bottom flask equipped with a paddle stirrer, 15-cm heated Vigreaux column, distillation head, condenser and graduated receiver. The apparatus is evacuated and refilled with nitrogen three times. A molten salt bath preheated to 220° C. is raised around the flask. After 2 hours, the temperature is slowly increased to 280° C. This takes 41 minutes. During this time, 6.9 mL of distillate is collected. Over the next 34 minutes, the pressure is slowly reduced to 1 mm of Hg and the temperature is raised to 321° C. The excess ethylene glycol is distilled. After an additional 10 minutes, the reaction mass is a viscous clear polymeric melt and the polymerization is stopped. As the molten polymer cools, it solidifies to an opaque off-white solid. The polymer is ground to a course powder in a centrifugal mill. Its inherent viscosity is 1.47 dL/g and its peak melting point as determined by differential scanning calorimetry is 280° C.

Four tenths gram of 3/16-in. chopped strand glass fibers (Owens Corning Fiberglass 408-BC) and 1.6 g of the above copolyester are kneaded together at 310° C. under vacuum until the glass strands are completely fibrillated and a uniform mixture is achieved. This mixture is compression molded at 310° C. into a sheet measuring 2×1×0.015 in. The dynamic storage modulus of a 1×0.4×0.015-inch sample cut from this sheet is measured as a function of temperature from 30° to 275° C. using a DuPont 983 Dynamic Mechanical Analyzer at a fixed frequency of 1 Hz and a scanning rate of 5° C/min. The composite retains a significant fraction of its stiffness up to 257° C. The storage modulus drops to 43% of its initial value just above the polymer's Tg at 123° C., then decreases slowly to 26 % of its initial value at 257° C. where it drops quickly to zero as the temperature approaches the polymer's melting point. The same test is run on a 20 wt. % glass fiber reinforced composite made from polyethylene terephthalate (Eastman Kodak 7352) in a similar fashion. The clear amorphous composite is annealed to an opaque white semicrystalline sheet at 160° C. for 10 min. Its dynamic storage modulus drops to 26% of its value at 30° C. at 230° C. where it drops rapidly to zero as the temperature approaches the polymer's melting point. These test results show that composites formed from glass fibers and the semicrystalline versions of the copolyester of this invention can retain a useful portion of their room temperature stiffness at temperatures significantly higher than composites made in the same way from a commercial sample of polyethylene terephthalate. Thus, the polyesters of this invention provide compositions that are useful for applications requiring a high room temperature modulus and the ability to retain a useful fraction of that modulus at high temperatures.

EXAMPLES 4-9

Following the procedures of Examples 1-3, polyesters are prepared from ethylene glycol and the following ratios of dimethyl 3,4'-biphenyldicarboxylate and dimethyl 4,4'-biphenyldicarboxylate: 100/0, 75/25, 50/50, 40/60, and 15/85. The properties of these polyesters are shown in Table I.

COMPARATIVE EXAMPLE A

Poly(ethylene 4,4'-biphenyldicarboxylate) is prepared from ethylene glycol and dimethyl 4,4'-biphenyldicarboxylate following the procedure given in Example 1. The polyester solidifies to an opaque white solid during its preparation. Its inherent viscosity taken in pentafluorophenol at 45° C. and 0.1 g/dL is 0.62 dL/g and its peak melting point and clearing temperature are 343° C. and 357° C., respectively. These properties are shown in Table 1.

TABLE I

Solution Viscosities and Thermal Properties of Copolyesters

| Examples and Comp. Examples | $[X/(X + Y)]^a$ | $\eta_{inh}$ (dL/g) | $T_g$ (°C.) | $T_m$ (°C.) | Oxygen Transmission Rate (OTR) (cc. mil./100 in.$^2$ day atm.) |
|---|---|---|---|---|---|
| 4 | 1.00 | 1.12 | 104$^c$ | no melting point | 6.84 |
| 5 | 0.75 | 0.64 | 103$^c$ | no melting point | 9.40 |
| 6 | 0.50 | 0.72 | 111$^c$ | 213 | 8.52 |
| 7 | 0.40 | 1.89 | 115$^d$ | 222 | not measured |
| 8 | 0.25 | 1.47 | 123$^d$ | 280 | not measured |
| 9 | 0.15 | 1.32 | 127$^d$ | 306 | not measured |
| Comp. | 0.00 | 0.62$^b$ | — | 343 | not measured |

TABLE I-continued
Solution Viscosities and Thermal Properties of Copolyesters

| Examples and Comp. Examples | $[X/(X+Y)]^a$ | $\eta_{inh}$ (dL/g) | $T_g$ (°C.) | $T_m$ (°C.) | Oxygen Transmission Rate (OTR) (cc. mil./100 in.² day atm.) |
|---|---|---|---|---|---|
| Ex. A | | | | | |

$^a$X/(X + Y)) is the mole fraction of 3,4'-biphenyldicarboxylate units in the copolyesters.
$^b$This polymer is insoluble in 35/65 vol/vol trifluoroacetic acid/methylene chloride. Its inherent viscosity is measured in pentafluorophenol at 45° C.
$^c$Determined by differential scanning calorimetry.
$^d$Determined by dynamic mechanical analysis.

The above data indicate that semicrystalline copolyesters of ethylene glycol, 3,4'-biphenyldicarboxylic acid and 4,4'-biphenyldicarboxylic acid have melting points well below the melting point of the homopolyester of ethylene glycol and 4,4'-biphenyldicarboxylic acid (Comparative Example A). Incorporation of about 0.15 mole fraction or more of 3,4'-biphenyldicarboxylate units into the polymers lowers the melting points of the polymers sufficiently that they can be melt fabricated without significant decomposition. These data also show that amorphous polyesters (no melting points) can be made by incorporating greater than about 0.5 mole fraction of 3,4'-biphenyldicarboxylate units into the polymers and that films of these amorphous polyesters are good barriers to oxygen, as indicated by their low oxygen transmission rates.

EXAMPLE 10

Preparation of Poly(0.80 butylene 4,4'-biphenyldicarboxylate-co-0.20 butylene 3,4'-biphenyldicarboxylate)

Dimethyl 3,4'-biphenyldicarboxylate (5.41 g, 0.0200 mole), 21.62 g (0.0800 mole) of dimethyl 4,4'-biphenyldicarboxylate, 18.24 g (0.200 mole) of 1,4-butanediol and 20 μL of titanium tetraisopropoxide are added to a 100-mL round bottom flask equipped with a paddle stirrer, 15-cm heated Vigreux column, distillation head, condenser and graduated receiver. The apparatus is evacuated and refilled with nitrogen three times. A molten salt bath preheated to 220° C. is raised around the flask and after the monomers have melted, the stirrer is started. Methanol begins to distill and after 20 minutes, 7.0 mL is collected. During the next 27 minutes, the temperature is increased to 281° C. then the pressure is slowly reduced to 1 mm Hg. The excess 1,4-butanediol distills and viscosity of the reaction mass slowly increases. After an additional 8 minutes, the clear colorless polymer melt becomes very viscous and the polymerization is stopped. As it cools, the polymer melt quickly crystallizes to an opaque white solid which is then ground to a course powder. The polymer's inherent viscosity is 1.16 dL/g and its peak melting point is 266° C.

EXAMPLE 11

Preparation of Poly(0.80 1,4-cyclohexanedimethylene 4,4'-biphenyldicarboxylate-co-0.20 1,4-cyclohexanedimethylene 3,4'-biphenyldicarboxylate This copolyester is prepared from 16.22 g (0.060 mole) of dimethyl 4,4'-biphenyldicarboxylate, 4.05 g (0.015 mole) of dimethyl 3,4'-biphenyldicarboxylate, 21.6 g (0.15 mole) of 1,4-cyclohexanedimethanol (73/27 trans/cis) and 15 μL of titanium tetraisopropoxide using the procedure of Example 3 except that the final temperature is 300° C. The polymer is an intensely opaque white solid having an inherent viscosity of 0.31 dL/g. Two overlapping endotherms centered at 280° and 307° C. are seen in the second heating scan of its DSC. A film of the polymer on a microscope slide is placed in a Linkam THM-60 hotstage and viewed between crossed polarizers on a Nikon Optiphot microscope at 400X while being heated. The polymer shows signs of flow at 282° C. The field remained bright and multicolored to 306° C. where it becomes dark. These data suggest that the polymer melts to an anisotropic liquid near 280° C. and clears to an isotropic melt near 307° C. The polymer's inherent viscosity is increased to 0.63 dL/g by heating it under vacuum at 235° C. for one hour and 250° C. for four hours.

What is claimed is:

1. A thermoplastic polyester having repeating units derived from at least one aliphatic diol having from 2 to 12 carbon atoms, and a dicarboxylic acid consisting of 3,4'-biphenyldicarboxylic acid, wherein up to 85 mol % of the dicarboxylic acid may be replaced with 4,4'-biphenyldicarboxylic acid, 3,4'-biphenyldicarboxylic acid and, optionally, 4,4'-biphenyldicarboxylic acid.

2. The polyester of claim 1 having repeating units represented by the formula:

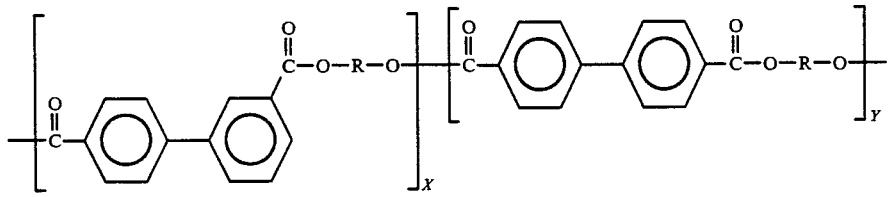

wherein
R is a predominantly hydrocarbylene moiety;
X+Y is from 10 to 1000; and
X/(X+Y) is from 0.05 to 1.0.

3. The polyester of claim 2 wherein R is (1) an alkylene moiety which has from 2 to about 12 carbons or a heteroalkylene which contains an alkylene group and a heteroatomic moiety which is oxygen, sulfur, sulfonyl or sulfoxyl; X+Y=50 to 500 and X/(X+Y)=0.15 to 1.0.

4. The polyester of claim 3 wherein alkylene is derived from ethylene glycol.

5. The polyester of claim 3 wherein alkylene is derived from 1,4-butanediol.

6. The polyester of claim 1 having repeating units represented by the formula:

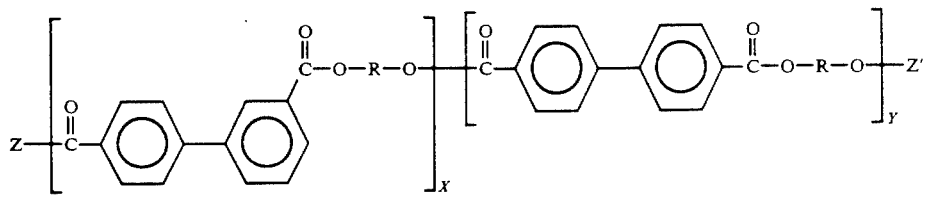

wherein R is alkylene having from 2 to 12 carbon atoms; X+Y is from 10 to 1000; X/(X+Y) is from 0.05 to 1.0; Z is a monovalent organic terminating group which is HO—, CH$_3$O—, HORO— or HORORO—, and Z' is a monovalent organic terminating group which is —H, —ROH, —C(O)C$_6$H$_4$—C$_6$H$_4$C(O)OCH$_3$ or —C(O)C$_6$H$_4$—C$_6$H$_4$C(O)OH, wherein R is defined previously.

7. The polyester of claim 1 prepared by contacting at least one aliphatic diol having from 2 to 12 carbon atoms with a lower alkyl diester or phenolic diester of 3,4'-biphenyldicarboxylic acid and, optionally, a lower alkyl diester or phenolic diester of 4,4'-biphenyl-dicarboxylic acid, in the presence of a catalyst at about 180° to about 300° C.

8. The polyester of claim 7 wherein the aliphatic diol is ethylene glycol, 1,4-butanediol or 1,4-cyclohexanedimethanol.

9. The polyester of claim 7 wherein the catalyst is titanium tetraisopropoxide.

10. The polyester of claim 7 wherein the catalyst is used in an amount of from about 0.001 to about 1.0 weight percent, based on the total weight of the reactants.

11. A process for preparing a thermoplastic polyester which comprises contacting at least one aliphatic diol having from 2 to 12 carbon atoms with a lower alkyl or phenolic diester of 3,4'-biphenyldicarboxylic acid and, optionally, a lower alkyl or phenolic diester of 4,4'-biphenyl-dicarboxylic acid in the presence of a catalyst at about 180° to about 300° C.

12. The process of claim 11 wherein the aliphatic diol is ethylene glycol, 1,4-butanediol or 1,4-cyclohexanedimethanol.

13. The process of claim 11 wherein the catalyst is titanium tetraisopropoxide.

14. The process of claim 11 wherein the catalyst is used in an amount of from about 0.001 to about 1.0 weight percent, based on the total weight of the reactants.

15. The polyester of claim 1 in the form of a fiber.

16. The polyester of claim 1 in the form of a film.

17. The polyester of claim 1 in the form of a three dimensional molded article.

18. The polyester of claim 1 in the form of a barrier container.

19. The polyester of claim 1 in the form of a coating.

* * * * *

UNITED STATES PATENT AND TRADEMARK OFFICE
CERTIFICATE OF CORRECTION

PATENT NO. : 5,138,022

DATED : August 11, 1992

INVENTOR(S) : Michael N. Mang and James L. Brewbaker, both of Midland, Mich.

It is certified that error appears in the above-identified patent and that said Letters Patent is hereby corrected as shown below:

Column 10, lines 35, 36, and 37, delete " of the dicarboxylic acid may be relaced with 4,4'-biphenyldicarboxylic acid, 3,4'-biphenyldicarboxylic acid and optionally, 4,4'-biphenyldicarboxylic acid. " and insert -- of the 3,4'-biphenyldicarboxylic acid may be replaced by 4,4'-biphenyldicarboxylic acid.

Column 10, lines 40 to 48, delete

"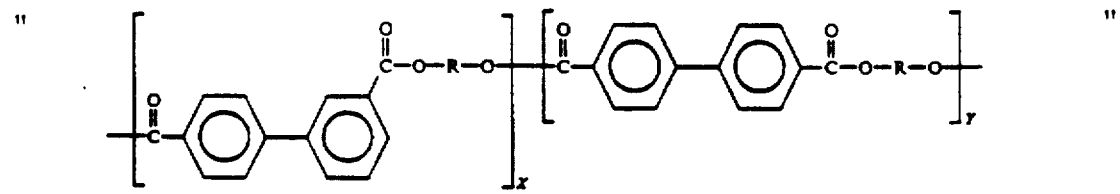"

and insert

--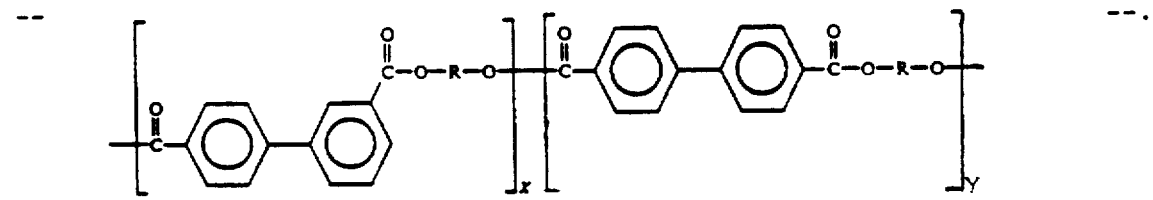--.

UNITED STATES PATENT AND TRADEMARK OFFICE
CERTIFICATE OF CORRECTION

PATENT NO. : 5,138,022

DATED : August 11, 1992

INVENTOR(S) : Michael N. Mang and James L. Brewbaker, both of Midland, Mich.

It is certified that error appears in the above-identified patent and that said Letters Patent is hereby corrected as shown below:

Column 11, line 0 to 10, delete

"
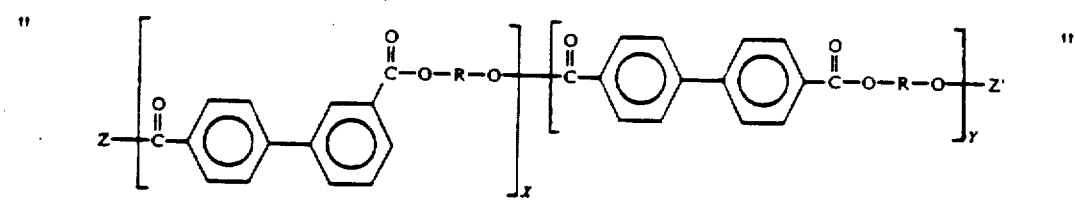
"

and insert

--
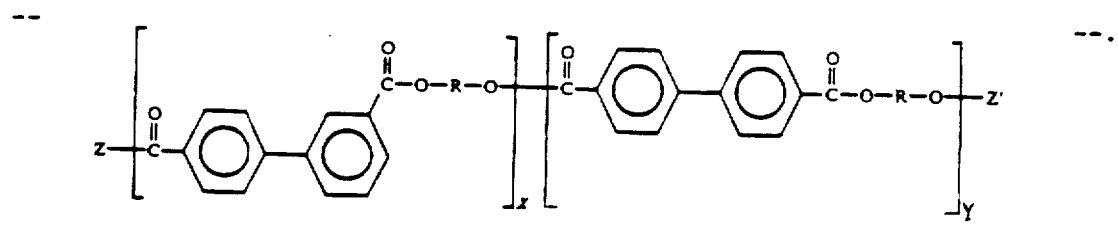
--.

Signed and Sealed this

Twenty-sixth Day of July, 1994

Attest:

BRUCE LEHMAN

Attesting Officer     Commissioner of Patents and Trademarks